United States Patent [19]

Ohyama

[11] Patent Number: 5,265,076
[45] Date of Patent: Nov. 23, 1993

[54] IMAGE RETRIEVAL APPARATUS USING COMBINATION RETRIEVAL ITEMS

[75] Inventor: Yasuhiro Ohyama, Kawasaki, Japan

[73] Assignee: Kabushiki Kaisha Toshiba, Kawasaki, Japan

[21] Appl. No.: 826,135

[22] Filed: Jan. 27, 1992

[30] Foreign Application Priority Data

Jan. 31, 1991 [JP] Japan ................................ 3-31713

[51] Int. Cl.⁵ .............................................. G11B 19/00
[52] U.S. Cl. ................................... 369/28; 369/27; 369/112; 369/275.1; 369/275.2
[58] Field of Search .................. 369/27, 28, 112, 125, 369/272, 275.1, 275.2

[56] References Cited

U.S. PATENT DOCUMENTS 5,023,856 6/1991 Raaymakers et al. ............ 369/275.1
5,107,482 4/1992 Goto et al. ...................... 369/275.2

*Primary Examiner*—Steven Mottola
*Assistant Examiner*—R. A. Ratliff
*Attorney, Agent, or Firm*—Cushman, Darby & Cushman

[57] ABSTRACT

A plurality of pieces of retrieval information constituted by a plurality of retrieval items are stored. These pieces of retrieval information are used to retrieve images set in correspondence with the retrieval items. A retrieval condition is set by combining a plurality of retrieval items of the stored retrieval items in order to retrieve a desired image corresponding to designated retrieval information of the stored retrieval information. Retrieval is performed in accordance with a retrieval condition input through an input means and the set retrieval condition.

4 Claims, 5 Drawing Sheets

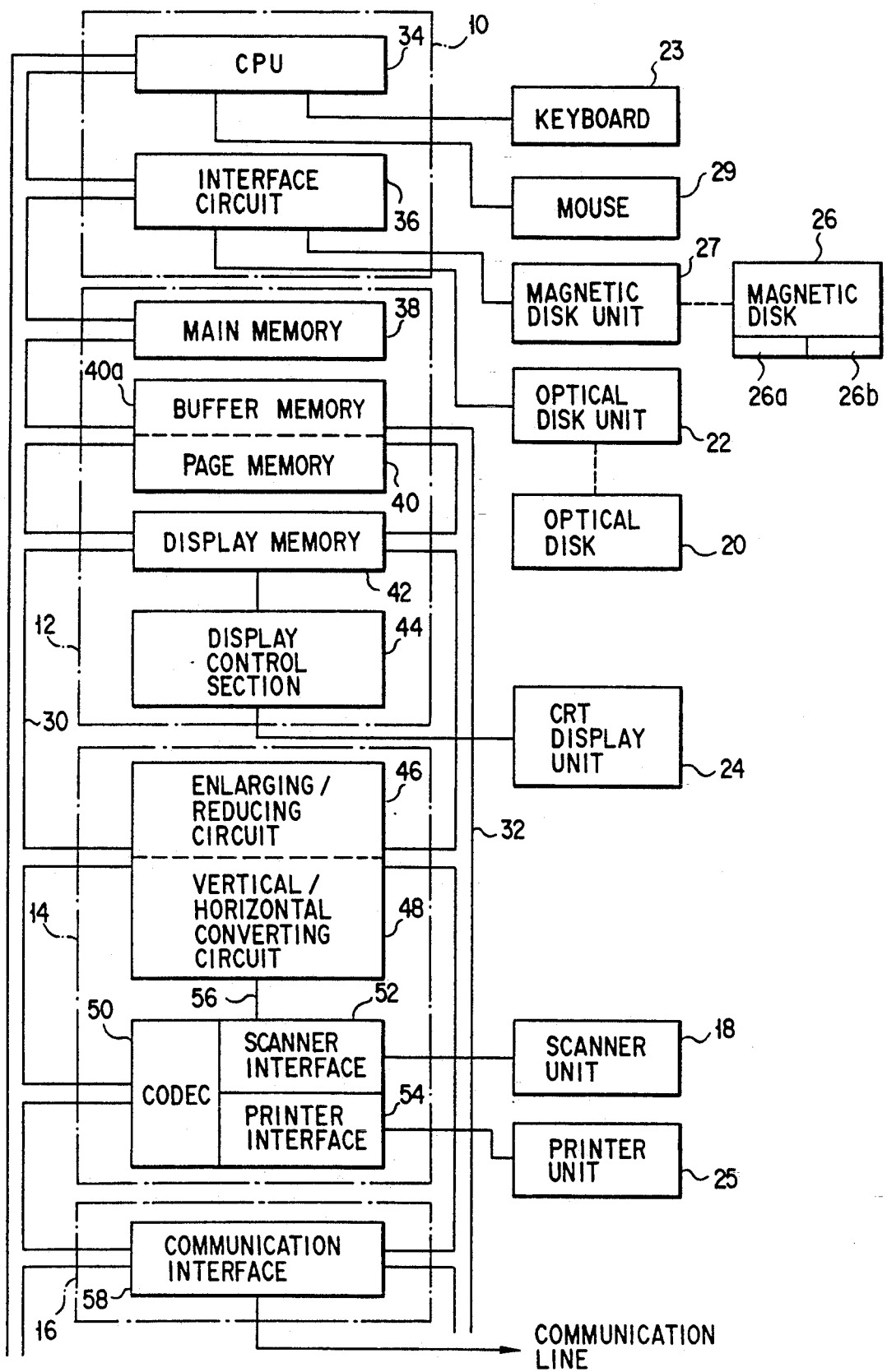
F I G. 1

| KEY NO. 1 | KEY LENGTH | KEY START ADDRESS |
|---|---|---|
| KEY NO. 2 | | |
| | | |
| KEY NO. n | | |
~26a
F I G. 3
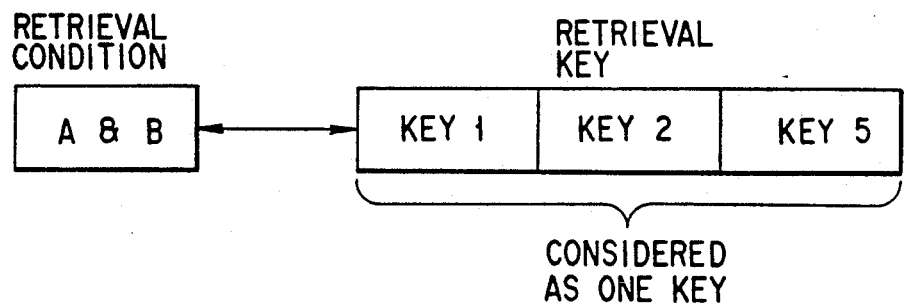
F I G. 4
| | LENGTH | ADDRESS |
|---|---|---|
| KEY 1 | 20 | 0 |
| KEY 3 | 18 | 25 |
~26a
F I G. 5

|  | KEY 1 | KEY 2 | KEY 3 |
|---|---|---|---|
| 1ST LINE | U.S.A  USSR | 00001 | ENGLAND  FRANCE |
| 2ND LINE | CHINA  ENGLAND | 00002 | JAPAN  GERMANY |

SET KEY LENGTH  KEY 1 = 20, KEY 2 = 5, KEY 3 = 18, RESPECTIVELY

F I G. 6

| RETRIEVAL CONDITION | |
|---|---|
| 1 | ENGLAND & GERMANY |
| 2 | |
| 3 | |
| 4 | |
| 5 | |

F I G. 8

IMAGE RETRIEVAL APPARATUS USING COMBINATION RETRIEVAL ITEMS

BACKGROUND OF THE INVENTION

1. Field of the Invention

The present invention relates to an image retrieval apparatus for storing a plurality of images together with, e.g., titles, each corresponding to one of the stored images, consisting of a plurality of retrieval keys, and used to retrieve a corresponding image, and for retrieving a desired image upon designation of corresponding retrieval keys.

2. Description of the Related Art

Recently, an image storage/retrieval apparatus such as an electronic filing apparatus has been put into practice. This apparatus is designed to read a large amount of images, e.g., documents, by using a two-dimensional scanning unit (scanner) perform optical two-dimensional scanning, store the read images in an optical disk, retrieve and read out an arbitrary one of the stored images, and output it through an output unit, e.g., a CRT display unit or a printer to allow visual or hardcopy-display of the retrieved image.

In such an apparatus, when a target image is to be retrieved, for example, a free text retrieval method is used. In this method, a retrieval key (a character string) is input for each retrieval item for retrieval, and an image to which a title including this retrieval key is assigned is selected.

According to the above-described electronic filing apparatus, titles, each assigned to a corresponding one of images to be managed and constituted by a plurality of retrieval keys, are recorded on an optical disk in which the images are also recorded, or are recorded on a magnetic disk as independent hardware. When the above-mention retrieval is to be performed, the titles assigned to all the images to be managed are read out from the optical disk or the magnetic disk so as to be compared with an input retrieval key.

In such a retrieval operation, a retrieval condition (a character string) must be set for each retrieval key, even if the same retrieval condition is to be set for a plurality of retrieval keys, resulting in poor operability.

SUMMARY OF THE INVENTION

The present invention is provided to solve the above-described drawback wherein retrieval conditions can only be designated in units of retrieval items, thus resulting in poor operability. Accordingly an object of the present invention is to provide an image retrieval apparatus which realizes improved operability by allowing designation of a retrieval condition by a combination of a plurality of retrieval items upon retrieval.

According to the present invention, there is provided an image retrieval apparatus, in which a plurality of images are stored together with a plurality of pieces of retrieval information respectively constituted by a plurality of retrieval items and used to retrieve the images set in correspondence with these retrieval items. The stored retrieval information is designated to retrieve a desired image corresponding to the designated retrieval information. The image retrieval apparatus comprises setting means for setting retrieval condition by combining a plurality of the stored retrieval items, input means for inputting a retrieval condition used for retrieval, and processing means for performing retrieval in accordance with the retrieval condition input by the input means and the retrieval condition set by the setting means.

According to the present invention, in the above-described arrangement, in which a plurality of images are stored together with a plurality of pieces of retrieval information respectively constituted by a plurality of retrieval items and used to retrieve images set in correspondence with these retrieval items, and the stored retrieval information is designated to retrieve a desired image corresponding to the designated retrieval information, a retrieval condition is set by combining a plurality of the stored retrieval items, and retrieval is performed in accordance with the retrieval condition input by the input means and the set retrieval condition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a schematic block diagram showing the overall arrangement of an image filing apparatus according to an embodiment of the present invention;

FIG. 3 is a view showing an arrangement of a key combination information table;

FIG. 4 is a view for explaining the relationship between a retrieval condition and retrieval keys in the embodiment in FIG. 1;

FIG. 5 is a view showing an example of information stored in the key combination information table in the embodiment in FIG. 1;

FIG. 6 is a view showing an example of information stored in a database in the embodiment in FIG. 1;

FIG. 8 is a view showing a retrieval condition input screen of a CRT display unit in the embodiment in FIG. 1.

DETAILED DESCRIPTION OF THE PREFERRED EMBODIMENT

Figure 2:
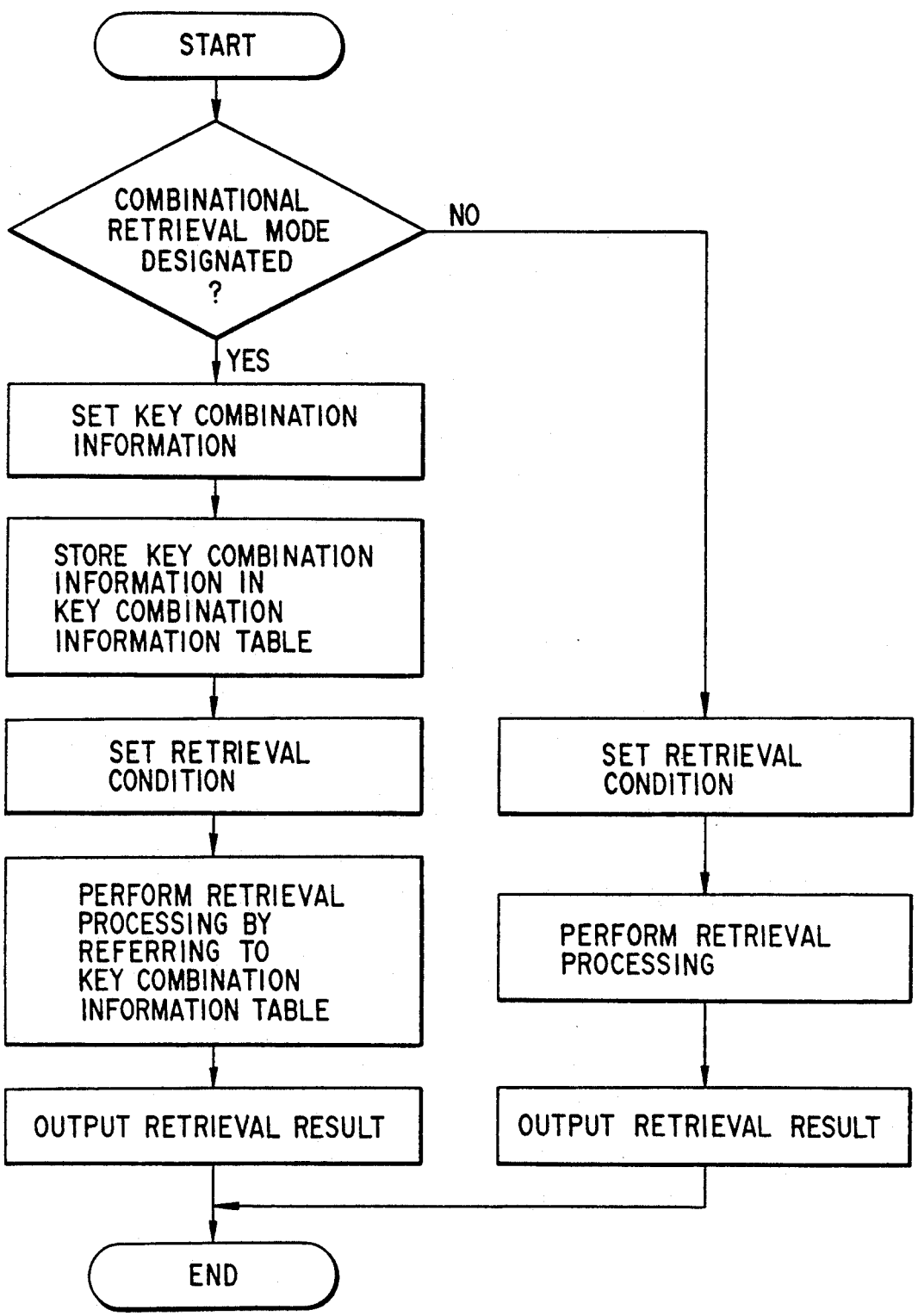
FIG. 2 is a flow chart for explaining a retrieval operation of the embodiment in FIG. 1.

An embodiment of the present invention will be described below with reference to the accompanying drawings.

FIG. 1 shows an image filing apparatus as an image retrieval apparatus of the present invention. The image filing apparatus comprises a control module 10, a memory module 12, an image processing module 14, a communication control module 16, a scanner unit 18, a rewritable optical disk 20, an optical disk unit 22, a keyboard 23, a CRT display apparatus 24, a printer unit 25, a magnetic disk 26, a magnetic disk unit 27, a mouse 29, a system bus 30, and an image bus 32.

The control module 10 is constituted by a CPU 34 for performing various control operations for, e.g., storage, retrieval, and editing processing of images, and an interface circuit 36 for connecting the optical disk unit 22 and the magnetic disk unit 27 to the CPU 34. In addition, the keyboard 23 and the mouse 29 are connected to the CPU 34. When images retrieved from the optical disk 20 or images supplied from the scanner unit 18 and stored in a page memory 40 (to be described later) are to be printed by the printer unit 25, and they are greatly different in size, the images in the page memory 40 are enlarged/reduced by an enlarging/reducing circuit 46 (to be described later) and are stored in the page memory 40 again, and the enlarged/reduced images are output to the printer unit 25.

The memory module 12 is constituted by a main memory 38 for storing various types of control programs and management information for storage, retrieval, and editing processing of images, the page memory 40 as an image memory having a storage capacity corresponding to images of several pages of A4-size documents, a display memory 42 and a display control section 44 which serve as a display interface, and the like. In the main memory 38, a character string buffer of a physical retrieval scheme is arranged. A buffer memory area 40a is allocated in a portion of the page memory 40. Control of write/read operations with respect to the buffer memory area 40a is performed by a counter (not shown). The page memory 40 is a memory for temporarily storing, e.g., images to be stored in the optical disk 20 or images read out therefrom. The display memory 42 serves to store images to be actually displayed on the display windows (not shown) of the CRT display unit 24, i.e., images obtained by performing image processing such as enlargement, reduction, rotation, insertion, or black/white inversion with respect to images in the page memory 40.

The image processing module 14 is constituted by the enlarging/reducing circuit 46 for enlarging/reducing images, a vertical/horizontal converting circuit 48 for performing rotation processing of an image by performing vertical/horizontal conversion of the image, a compressing/expanding circuit (CODEC) 50 for performing coding operations of images, i.e., compression (reducing redundancy) and expansion (restoring reduced redundancy to original redundancy), a scanner interface 52 used for the scanner unit 18, a printer interface 54 used for the printer unit 25, and an internal bus 56 for connecting the expanding/reducing circuit 46 and the vertical/ horizontal circuit 48 to the compressing/expanding circuit 50, the scanner interface 52, and the printer interface 54.

The communication control module 16 is constituted by a communication interface 58 such as a BCP (Bus Communication Processor) to be connected to, e.g., a LAN. In addition, the communication control module 16 may be constituted by an FCP (Facsimile Connection Processor) and a UCP (Universal Communication Processor) to be connected to an external unit such as a personal computer through an interface.

The communication control module 16 supplies a title (retrieval information), transmitted through a communication line, to the main memory 38 and transmits an image corresponding to the transmitted retrieval information. In addition, the communication control module 16 supplies image data to be stored in the optical disk 20 to the page memory 40 and supplies a title corresponding to the image to the main memory 38.

The system bus 30 is a bus for control signals to the respective units and serves to connect the control module 10 to the memory module 12, the image processing module 14, and the communication control module 16. The image bus 32 is a bus for image data and serves to connect the memory module 12 to the image processing module 14 and the communication control module 16.

The scanner unit 18 is, for example, a two-dimensional scanning unit for obtaining electrical signals corresponding to images on a original (document) by two-dimensionally scanning the original. This scanner unit 18 can handle large sizes of drawings, e.g., A1 size and A2 size, as well as document sizes, e.g., A3 size, A4 size, and B4 size.

The optical disk unit 22 sequentially stores images, read by the scanner unit 18, in the optical disk 20. In addition, the optical disk unit 22 serves to retrieve an image corresponding to a title, designated through the keyboard 23 or the like, from the optical disk 20.

The keyboard 23 is used to input a specific title corresponding to an image to be stored in the optical disk 20, and various types of operation commands for storage, retrieval, and editing processing.

The mouse 29 serves to select or designate display contents (various operation modes, icons, and the like) at the position of a mouse pointer (cursor), displayed on a display window on the CRT display unit 24, by arbitrarily moving the mouse pointer in the vertical and horizontal directions and providing a command at a desired position.

The CRT display unit (cathode-ray tube) 24 displays an image read by the scanner unit 18 and an image retrieved from the optical disk 20. The display area of the CRT display unit 24, used for displaying images, can be divided into a maximum of four windows (not shown). That is, the CRT display unit 24 is a multi-widow type display u it capable of simultaneously displaying four images by using the four windows. Images displayed on the respective windows are independently subjected to editing processing such as enlargement, reduction, rotation, or scroll processing.

The printer unit 25 prints (hard copy) images read by the scanner unit 18, images retrieved from the optical disk 20, or images displayed on the CRT display unit 24.

The magnetic disk unit 27 serves to write or read data in or from the magnetic disk 26 loaded therein. A key combination information table 26a is stored in the magnetic disk 26. As shown in FIG. 3, in this key combination information table 26a, the attributes of keys as a key combination for retrieval, e.g., key lengths, the start addresses of the keys, and the types (character or numeral) of the keys are stored in units of key numbers of keys as a key combination for retrieval. These attribute data are generated by an amount corresponding to the number of keys as a key combination for retrieval. With this operation, a plurality of retrieval keys (retrieval items) are used as one retrieval key with respect to one retrieval condition, as shown in FIG. 4.

Assume, as shown in FIG. 5, that "key 1, 20, 0" and "key 3, 18, 25" are stored in the key combination information table 26a. In this case, key 1 and key 3 are set as a key combination for retrieval. The contents of the key combination information table 26a are written in the main memory 38 upon turning on the power source.

A database 26b is arranged in the magnetic disk 26. In this database 26b, the storage addresses of images stored in the optical disk 20 and their titles are stored in correspondence with each other. As the titles, for example, as shown in FIG. 6, "key 1: America, Soviet Union, key 2: 00001, key 3: England, France" is stored in the first line, and "key 1: China, England, key 2: 00002, key 3: Japan, Germany" is stored in the second line.

Figure 7:
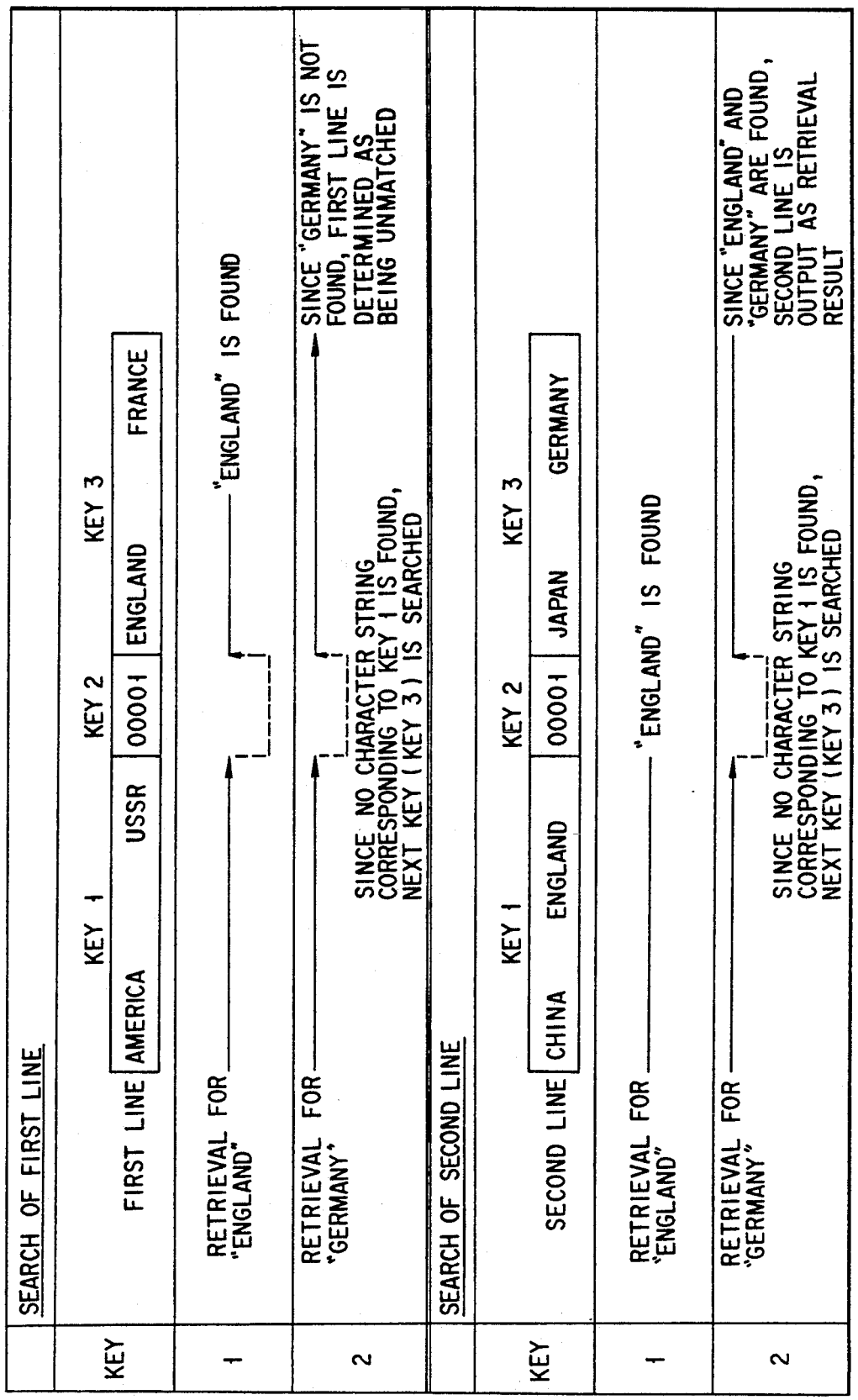
FIG. 7 is a view for explaining a sequence of retrieval processing in the embodiment in FIG. 1.

A retrieval operation in this arrangement will be described below with reference to the flow chart of FIG. 2 and the flow of retrieval processing shown in FIG. 7. When a retrieval mode is designated, the CPU 34 provides guidance information as to whether combinational retrieval is performed. If the combinational retrieval mode is designated in accordance with this guidance information, the CPU 34 causes the CRT display unit 24 to display guidance information for setting key combination information. In this case, the title structures of the respective keys may be simultaneously displayed to select keys having the same title structure.

With this display, a user inputs retrieval key numbers as key combination information by using the keyboard 23 or the mouse 29. If, for example, key 1 and key 3 are input, the key lengths and start addresses of keys used as a key combination for retrieval are stored in the key combination information table 26a in the magnetic disk 26, as shown in FIG. 5.

Subsequently, the CPU 34 causes the CRT display unit 24 to display a retrieval condition input table, as shown in FIG. 8. The user then inputs retrieval conditions by using the keyboard 23 in accordance with this display. For example, "England and Germany" is set for only key 1.

Assume that the titles shown in FIG. 6 are registered in the database 26b in the magnetic disk 26, and that retrieval condition "England and Germany" is input with respect to key 1, as shown in FIG. 8. In this case, when the execution of retrieval is designated, the CPU 34 determines that retrieval is performed by using key 1 and key 3 as a key combination in accordance with the storage contents of the key combination information table 26a, and searches key 1 and key 3 with the retrieval condition "England and Germany" set for key 1.

For example, a search is performed with respect to the title in the first line of the database 26b in the magnetic disk 26. The character strings of key 1 and key 3 are searched for the first retrieval condition element "England". The corresponding character string is found in key 3. Furthermore, the character strings of key 1 and key 3 are searched for the second retrieval condition element "Germany". In this case, it is determined that no corresponding character string is present in key 1 and key 3.

Since the title in the first line does not satisfy the retrieval condition "England and Germany", the first line data is not stored in the main memory 38. Subsequently, a search operation is performed with respect to the title in the second line of the database 26b. The character strings of key 1 and key 3 are searched for the first retrieval condition element "England". The corresponding character string is found in key 1. Furthermore, the character strings of key 1 and key 3 are searched for the second retrieval condition element "Germany". The corresponding character string is present in key 3. Since "England" and "Germany" are found with this operation, the title in the second line satisfies the retrieval condition "England and Germany". Therefore, the second line data is stored, as a retrieval result, in the main memory 38.

When retrieval processing for all the titles stored in the database 26b is completed, the CPU 34 causes the CRT display unit 24 to display the titles corresponding to the retrieval results stored in the main memory 38, and ends the processing.

If the combinational retrieval mode is not designated, retrieval conditions are set for the respective keys, and retrieval processing is performed in accordance with the retrieval conditions.

As described above, in retrieval, the same retrieval condition can be designated for a combination of a plurality of retrieval keys. When retrieval conditions are to be set, a retrieval condition common to a plurality of retrieval keys need only be set for one retrieval key, resulting in excellent operability. The present invention is especially effective in a case wherein a common retrieval condition is to be set for a combination of a large number of retrieval keys.

As described above, the present invention provides an image retrieval apparatus which realizes excellent operability by allowing designation of a retrieval condition by a combination of a plurality of retrieval items upon retrieval.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for retrieving an image recorded in an optical disk, comprising:
    an optical disk for recording a plurality of images;
    retrieval information storage means for storing a plurality of retrieval keys each comprising data corresponding to a respective one of said images;
    means for combining at least two of said plurality of retrieval keys as a combined retrieval key;
    means for setting a combinational retrieval condition; and
    means for retrieving said at least two of said images recorded in said optical disk via said combined retrieval key in accordance with said combination retrieval condition set by said setting means.

2. An apparatus according to claim 1, further comprising means for selecting a normal retrieval mode and a combinational retrieval mode, said means for retrieving retrieves said images recorded in said optical disk via said retrieval keys when said selecting means selects said normal retrieval mode and said means for retrieving retrieves said images recorded in said optical disk via said combined retrieval key when said selecting means selects said combined retrieval mode.

3. An apparatus according to claim 1, wherein said combinational retrieval condition corresponds to a portion of said data of each of said at least two retrieval keys.

4. An apparatus for retrieving an image recorded in an optical disk, comprising:
    an optical disk for recording a plurality of images;
    retrieval information storage means for storing a plurality of retrieval keys each comprising data corresponding to a respective one of said images;
    means for storing, in a memory table, key combination data including key number data associated with at least two of said plurality of retrieval keys and corresponding attribute data representing a combination retrieval condition which enables at least two images to be retrieved via said key combination data; and
    means for retrieving at least two of said images, each corresponding to one of said plurality of retrieval keys, via said key combination data.

* * * * *